United States Patent [19]
Masghati

[11] Patent Number: 6,072,683
[45] Date of Patent: Jun. 6, 2000

[54] MINIATURIZED CATEGORY 5 PROTECTION CIRCUIT

[75] Inventor: Mohammad Masghati, Carol Stream, Ill.

[73] Assignee: Illinois Tool Works Inc., Glenview, Ill.

[21] Appl. No.: 09/261,857

[22] Filed: Mar. 3, 1999

[51] Int. Cl.[7] ................................................ H02H 1/00
[52] U.S. Cl. ............................................................. 361/119
[58] Field of Search .................................. 361/54, 56, 58, 361/91.1, 91.5, 118, 119, 126, 127

[56] References Cited

U.S. PATENT DOCUMENTS

| | | | |
|---|---|---|---|
| 5,563,761 | 10/1996 | Apa et al. | 361/119 |
| 5,706,160 | 1/1998 | Latuszkin et al. | 361/119 |
| 5,717,561 | 2/1998 | Peng | 361/119 |
| 5,841,620 | 11/1998 | Masghati | 361/119 |

*Primary Examiner*—Ronald W. Leja
*Attorney, Agent, or Firm*—Donald J. Breh; Mark W. Croll; John P. O'Brien

[57] ABSTRACT

A miniaturized Category 5 protection device for protecting telecommunication related equipment and the like from power and transient surges includes a plurality of sets of line-pair wires. Voltage suppressor circuitry is interconnected between each of the plurality of sets of line-pair wires. One of the plurality of sets of line-pair wires has a first input tip terminal, a first input ring terminal, a first output ring terminal, and a first output ring terminal. Another one of the plurality of sets of line-pair wires has a second input tip terminal, a second input ring terminal, a second output tip terminal, and a second output ring terminal. Variable capacitance circuitry is coupled between the first input tip terminal and the second input tip terminal, the first input ring terminal and the second input ring terminal, the first output tip terminal and the second output ring terminal, and the first output ring terminal and the second output tip terminal for preventing crosstalk between the one of the plurality of sets of line-pair wires and the other one of the plurality of sets of line-pair wires.

6 Claims, 2 Drawing Sheets

MINIATURIZED CATEGORY 5 PROTECTION CIRCUIT

BACKGROUND OF THE INVENTION

This invention relates generally to surge protection circuitry for protecting telephone related equipment which meets the TIA specification for Category 5. More particularly, it relates to a miniaturized Category 5 protection circuit which includes variable capacitance means connected between different sets of line-pair wires for preventing crosstalk therebetween.

In U.S. Pat. No. 5,706,160 to W. Latuszkin et al. issued on Jan. 6, 1998, and assigned to the same assignee as the present invention, there is disclosed a surge protector module 10 for protecting telecommunication equipment and the like from power and transient surges which includes a housing 12 for receiving and enclosing a printed circuit board 26. The printed circuit board 26 is disposed within the housing for mounting a plurality of circuit surge protector devices 28a–28d. This '160 patent is hereby incorporated be reference.

The printed circuit board 26 includes a tip conductive trace 62 formed on a top side thereof and a ring conductive trace 64 formed on a bottom surface thereof. The surge circuit protector device includes voltage suppressor means and diode means. The voltage suppressor means is operatively connected to the tip and ring conductive traces. The diode means is interconnected between the tip conductive trace 62 and the ring conductive trace 64 and in series with the voltage suppressor means for reducing the capacitance therebetween caused by the voltage suppressor means.

In order to meet the near end crosstalk (NEXT) criteria of the Telecommunication Industry Association (TIA) for Category 5 the distances between adjacent pairs of tip and ring conductive traces for each set of surge protector devices in the '160 patent had to be increased. However, in view of the trend of reducing the electrical component size so as to have a higher density, it was found that the conductive traces had to be spaced more closely together due to the miniaturization of the Category 5 surge protector devices. As a result, the prior art Category 5 surge protector devices became unacceptable and were found to be unable to meet the NEXT criteria because of the miniaturization.

Accordingly, it would be desirable to provide a miniaturized Category 5 protection circuit for protecting telecommunication related equipment from power and transient surges and yet still meet the NEXT criteria of the TIA specification for Category 5. This is accomplished in the present invention by adding variable capacitance means interconnected between different sets of line-pair wires so as to prevent crosstalk therebetween.

SUMMARY OF THE INVENTION

Accordingly, it is a general object of the present invention to provide a new and improved miniaturized Category 5 protection circuit which is relatively simple and economical to manufacture and assemble.

It is an object of the present invention to provide a miniaturized protection device for protecting telecommunication related equipment and the like from power and transient surges and meets the NEXT criteria of the TIA specification for Category 5.

It is another object of the present invention to provide a miniaturized protection device for protecting telecommunication related equipment and the like from power and transient surges which includes a voltage suppressor circuitry and variable capacitance circuitry interconnected between different sets of line-pair wires so as to prevent crosstalk therebetween.

It is still another object of the present invention to provide a miniaturized Category 5 protection device which includes variable capacitance means formed of four pairs of back-to-back diodes.

In a preferred embodiment of the present invention, there is provided a miniaturized Category 5 protection circuit device for protecting telecommunication related equipment and the like from power and transient surges which includes a plurality of sets of line-pair wires. Voltage suppressor circuitry is interconnected between each of the plurality of sets of line-pair wires. One of the plurality of sets of line-pair wires has a first input tip terminal, a first input ring terminal, a first output tip terminal, and a first output ring terminal. Another one of the plurality of sets of line-pair wires has a second input tip terminal, a second input ring terminal, a second output tip terminal, and a second output ring terminal. Variable capacitance circuitry is coupled between the first input tip terminal and the second input tip terminal, the first input ring terminal and the second input ring terminal, the first output tip signal and the second output ring terminal, and the first output ring terminal and the second output tip terminal for preventing crosstalk between the one of the plurality of sets of line-pair wires and the other one of the plurality of sets of line-pair wires.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1:
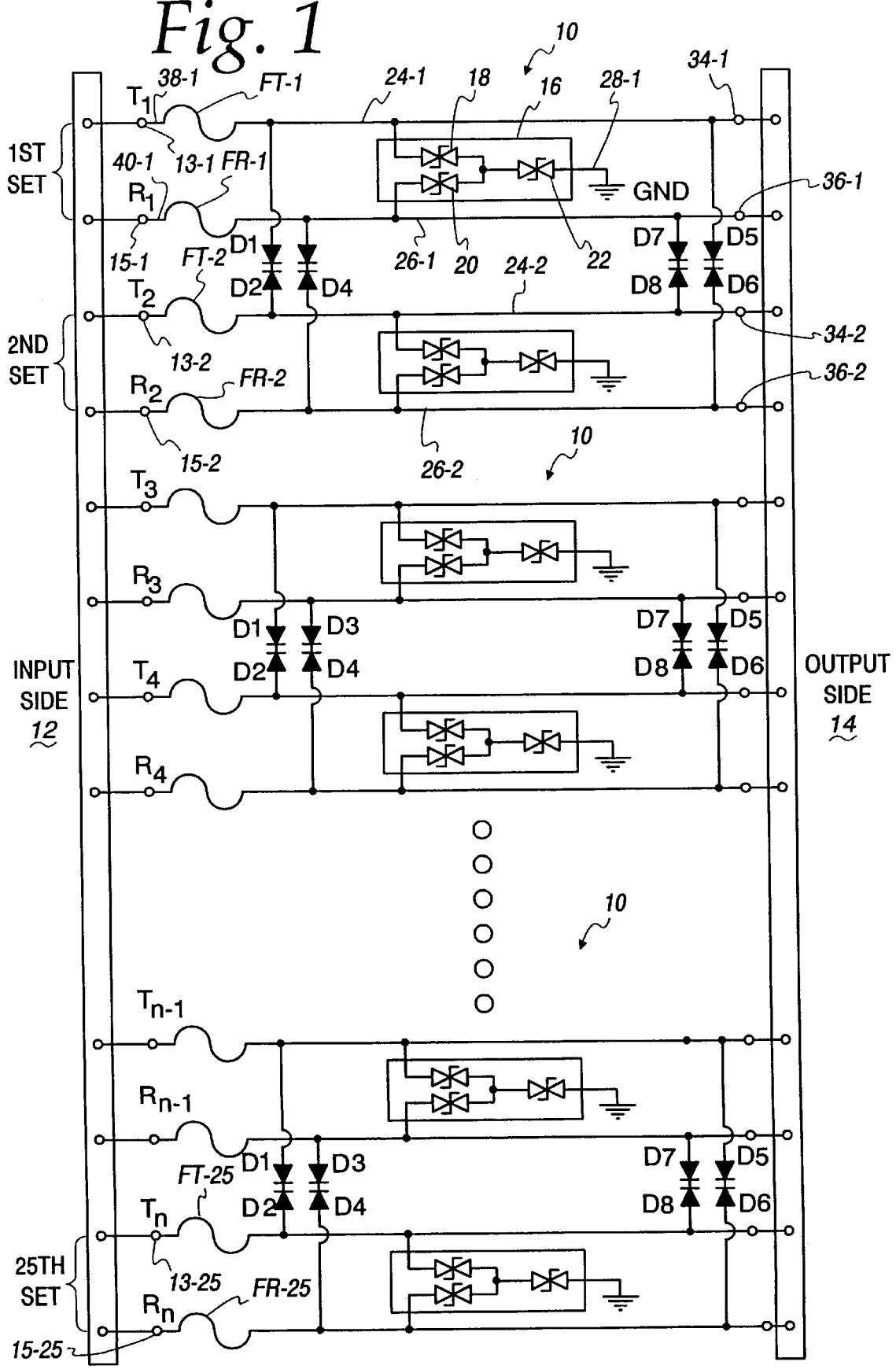
FIG. 1 is a schematic circuit diagram of a miniaturized Category 5 protection device, constructed in accordance with a first embodiment of the present invention.

Referring now in detail to the drawings, there is illustrated in FIG. 1 a schematic circuit diagram of a miniaturized Category 5 protection device 10 which is constructed in accordance with a first embodiment of the present invention. The miniaturized protection device 10 is adapted to be interposed between an input or exposed side 12 having a first set of transmission line-pair wires with input tip terminal 13-1 ($T_1$) and input ring terminal 15-1 ($R_1$), and an output or protected side 14. The other remaining sets of transmission line-pair wires with their respective input tip and ring terminals 13-2, 15-2, through 13-25, 15-25 ($T_2$, $R_2$ through $T_{25}$, $R_{25}$) are each joined to corresponding protection devices 10 as shown in FIG. 1. It should be understood that there may be up to 24 added line-pair wires. Each of the protection devices 10 is utilized to protect sensitive telephone equipment coupled to one of the 25-pairs of wires (50 lines) on the output side 14 from transient voltage surges and overcurrent conditions but yet still meets the NEXT criteria of the TIA specification for Category 5.

Since each of the miniaturized Category 5 protection devices 10 is identical in its construction, it is believed sufficient to describe in detail only one of them. The miniaturized Category 5 protection device 10 is comprised of a surge suppressor circuit 16 defining voltage suppressor means and four pairs of back-to-back diodes D1–D8 defining variable capacitance means. The surge suppressor circuit 16 includes three solid-state voltage suppressors 18, 20, 22 connected in a Y-configuration between wires 24-1, 26-1, and 28-1. The wires 24-1 and 26-1 are connected output tip and ring terminals 34-1, 36-1 associated with the output side 14 which is connectible to two wires of the telephone communication equipment to be protected. The wire 28-1 is connected to a ground potential.

The first pair of back-to-back diodes D1, D2 have their cathodes connected together. The anode of the diode D1 is connected also to the wire 24-1, associated with the first set of line-pair wires, and the anode of the diode D2 is connected to the wire 24-2 associated with the second set of line-pair wires. The second pair of diodes D3, D4 have their cathodes connected together. The anode of the diode D3 is connected also to the wire 26-1 associated with the first set of line-pair wires, and the anode of the diode D4 is connected to the wire 26-2 associated with the second set of line-pair wires.

The third pair of diodes D5, D6 have their cathodes connected together. The anode of the diode D5 is coupled to the output tip terminal 34-1 associated with the first set of line-pair wires via the wire 24-1, and the anode of the diode D6 is coupled to the output ring terminal 36-2 associated with the second set of line-pair wires via the wire 26-2. The fourth pair of diodes D7, D8 have their cathodes connected together. The anode of the diode D7 is connected to the output ring terminal 36-1 associated with the first set of line-pair wires via the wire 26-1, and the anode of the diode D8 is coupled to the output tip terminal 34-2 associated with the second set of line-pair wires via the wire 26-2.

Each of the voltage suppressors 18-22 may be formed of a silicon avalanche suppressor (SAS), sidactor, gas tube, or Zener diode. In this preferred embodiment, the voltage suppressors 18-22 are silicon avalanche suppressors similar to the type 1.5 KE18CA. Each of the diodes D1–D8 in the diode pairs can be similar to the type BAV21 which has a low capacitance.

It has been determined by the inventors that in order to meet the crosstalk criteria (NEXT) for Category 5 the pair-to-pair impedance must been increased. In other words, the capacitance between (1) an input tip terminal associated with a first set of line-pair wires and an input tip terminal associated with a second set of line-pair wires; (2) an input ring terminal associated with the first set of line-pair wires and an input ring terminal associated with the second set of line-pair wires; (3) the output tip terminal associated with the first pair and the output ring terminal associated with the second set; and (4) the output ring terminal associated with the first set and the output tip terminal associated with the second set for each of the 25-pairs must be decreased to a small value. It was found that this could be accomplished by adding the low capacitance diodes D1–D8 discussed above and as shown in FIG. 1.

Further, the first pair of diodes D1, D2 are connected so as to prevent the normal incoming voice signals from going between one set of line-pair wires and another set of line-pair wires. Specifically, the diode D1 blocks negative signals and the diode D2 blocks positive signals on the input tip terminal 13-1 from going to the input tip terminal 13-2, and vice-versa. Likewise, the diode D3 blocks negative signals and the diode D4 blocks positive signals on the input ring terminal 15-1 from going to the input ring terminal 15-2, and vice-versa.

While the four pairs of diodes D1–D8 are connected in FIG. 1 in association with only the first and second sets of line-pair wires, it should be apparent to those skilled in the art that these four pairs of diodes may be connected between one set of line-pair wires and any other set of line-pair wires. For example, they could be applied to two, three, four or any number of different line-pairs of wires such as between the first set and the third set; the second set and the third set; the third set and the fourth set; the first set and the fourth set; and so on.

Further, each of the Category 5 protection devices 10 includes a pair of sneak current fuses FT-1 and FR-1 which are used to provide overcurrent protection. One end of the first FT-1 is connected to the input tip terminal 13-1 by means of a wire 38-1 and the other end thereof is connected also to the wire 24-1. One end of the fuse FR-1 is connected to the input ring terminal 15-1 by means of a wire 40-1, and the other end thereof is also connected to the wire 26-1. The additional pairs of fuses FT-2, FR-2, through FT-25, FR-25 are used in association with the remaining sets of line-pair wires. These fuses may be alternatively replaced by any other type of current interrupting device such as positive temperature coefficient (PTC) devices. Optionally, all of the fuses may be eliminated entirely.

Figure 2:
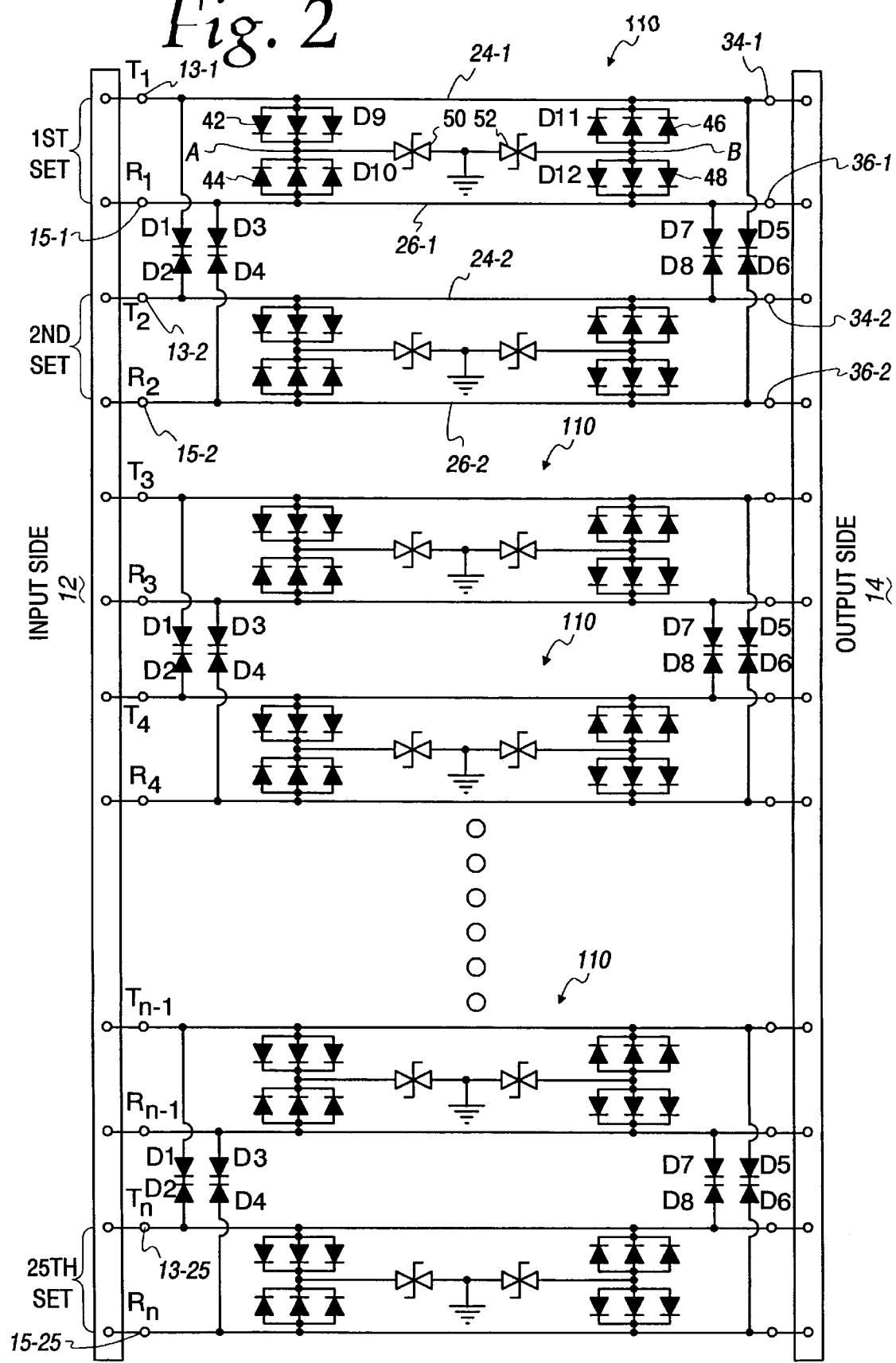
FIG. 2 is a schematic circuit diagram of a miniaturized Category 5 protection device, constructed in accordance with a second embodiment of the present invention.

In FIG. 2 of the drawings, there is illustrated a schematic circuit diagram of a Category 5 protection device 110 constructed in accordance with a second embodiment of the present invention. As can be seen, the protection device 110 of the second embodiment is substantially identical to the first embodiment of FIG. 1, except that the three silicon avalanche suppressors 18-22 have been replaced with four banks of rectifier diodes 42, 44, 46 and 48 and a pair of voltage suppressors 50, 52. Further, it will be noted that the sneak current fuses FT-1, FR-1 through FT-25, FR-25 have been eliminated.

As can be seen, each of the four banks 42–48 of diodes is comprised of three (3) low capacitance diodes connected in parallel. The first bank 42 is formed of three diodes D9 connected in parallel with their common cathodes connected together at a node A. The common anodes of the diodes D9 are also connected together and further joined to the wire 24-1. The second bank 44 is formed of three diodes D10 connected in parallel with their common cathodes connected together also at the node A. The common anodes of the diodes D10 are connected together and to the wire 26-1.

Similarly, the third bank 46 is formed of three diodes D11 connected in parallel with their common anodes connected together at node B. The common cathodes of the diodes D11 are connected together and further joined to the wire 24-1. The fourth bank 48 is formed of three diodes D12 connected in parallel with their common anodes connected together at the node B. The common cathodes of the diodes D12 are also connected together and to the wire 26-1. Each of the diodes D9-D12 in the respective banks 42–48 can be similar to the type BAV21 which has a low capacitance.

The first voltage suppressor 50 has its one end connected to the node A and its other end connected to a ground potential. Similarly, the second voltage suppressor 52 has its one end connected to the node B and its other end connected also to the ground potential. Each of the voltage suppressors 50, 52 may be formed of a silicon avalanche suppressor (SAS), sidactor, gas tube, or Zener diode. In this preferred embodiment, the voltage suppressors 50 and 52 are silicon avalanche suppressors similar to the type 1.5 KE18CA.

From the foregoing detailed description, it can thus be seen that the present invention provides a miniaturized Category 5 protection device for protecting telecommunication related equipment and the like from power and transient surges which includes voltage suppressor circuitry and variable capacitance circuitry. The variable capacitance circuitry is interconnected between a first set of line-pair wires and a second set of line-pair wires so as to prevent crosstalk therebetween.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A miniaturized protection device for protecting telecommunication related equipment from power and transient surges, comprising:

a plurality of sets of line-pair wires;

voltage suppressor means interconnected between both lines of the line-pair wires in each set of said plurality of sets of line-pair wires;

one of said plurality of sets of line-pair wires having a first input tip terminal, a first input ring terminal, a first output tip terminal, and a first output ring terminal;

another one of said plurality of sets of line-pair wires having a second input tip terminal, a second input ring terminal, a second output tip terminal, and a second output ring terminal;

variable capacitance means coupled between said first input tip terminal and said second input tip terminal, said first input ring terminal and said second input ring terminal, said first output tip terminal and said second output ring terminal, and said first output ring terminal and said second output tip terminal for preventing crosstalk between said one of said plurality of sets of line-pair wires and said another one of said plurality sets of line-pair wires;

said variable capacitance means being formed comprised of first through fourth pairs of back-to-back diodes;

said first pair of back-to-back diodes including a first diode and a second diode, said first and second diodes having their cathodes connected together, said first diode having its anode connected to said first input tip terminal, said second diode having its anode connected to said second input tip terminal;

said second pair of back-to-back diodes including a third diode and a fourth diode, said third and fourth diodes having their cathodes connected together, said third diode having its anode connected to said first input ring terminal, said fourth diode having its anode connected to said second input ring terminal;

said third pair of back-to-back diodes including a fifth diode and a sixth diode, said fifth and sixth diodes having their cathodes connected together, said fifth diode having its anode connected to said first output tip terminal, said sixth diode having its anode connected to said second output ring terminal; and said fourth pair of back-to-back diodes including a seventh diode and an eighth diode, said seventh and eighth diodes having their cathodes connected together, said seventh diode having its anode connected to said first output ring terminal, said eighth diode having its anode connected to said second output tip terminal.

2. A miniaturized protection device as claimed in claim 1, wherein said plurality of sets of line-pair wires is comprised of 25-pairs of wires.

3. A miniaturized protection device as claimed in claim 1, wherein said voltage suppressor means is comprised of first, second and third silicon avalanche suppressors.

4. A miniaturized protection device as claimed in claim 1, wherein said voltage suppressor means is comprised of four banks of diodes and a pair of voltage suppressors.

5. A miniaturized protection device as claimed in claim 1, further comprising current interrupting means connected to said first input tip and ring terminals and to said second input tip and ring terminals for providing overcurrent protection.

6. A miniaturized protection device as claimed in claim 5, wherein said current interrupting means is comprised of a pair of sneak current fuses associated with each of said plurality of sets of line-pair wires.

* * * * *